Sept. 20, 1949.  J. M. FOWLER  2,482,409
THROUGH CONDUIT GATE VALVE
Filed Sept. 9, 1947
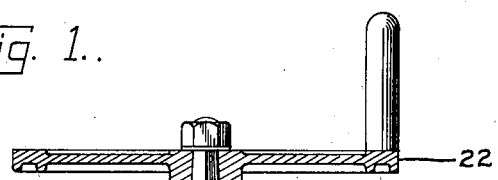
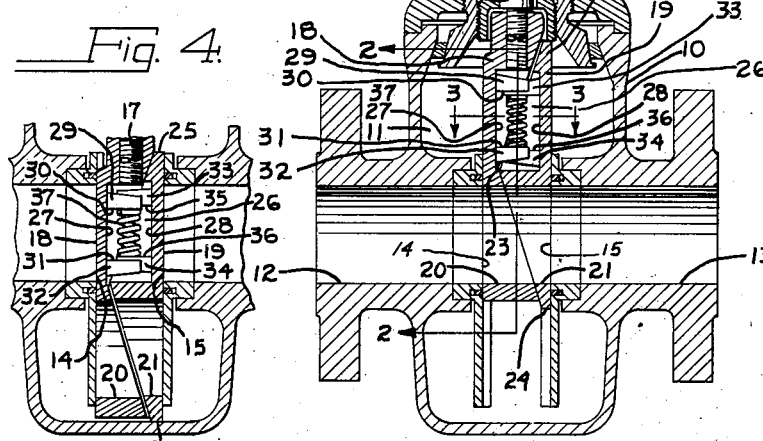
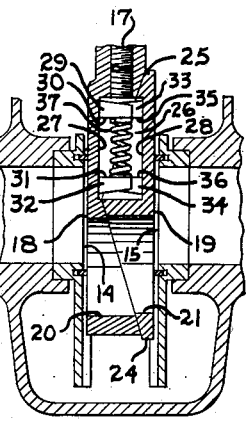
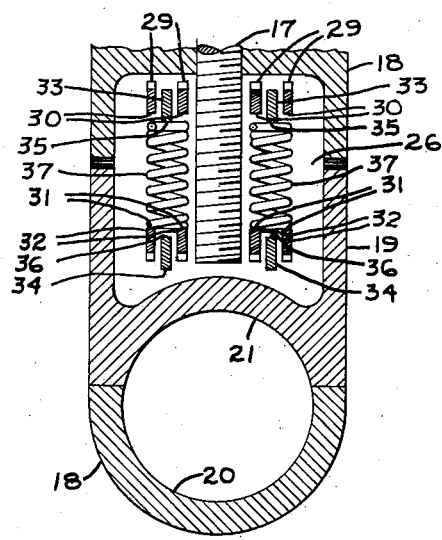
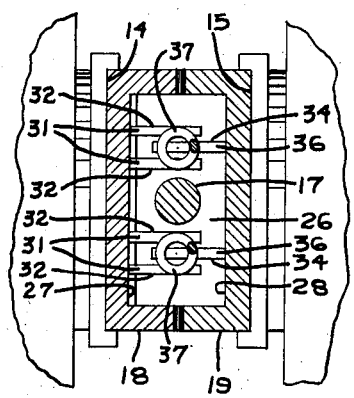
INVENTOR.
James M. Fowler
BY
Lee B. Kemon
ATTORNEY.

Patented Sept. 20, 1949

2,482,409

UNITED STATES PATENT OFFICE 2,482,409

THROUGH CONDUIT GATE VALVE

James M. Fowler, La Porte, Tex., assignor to W-K-M Company, Inc., Houston, Tex., a corporation of Texas Application September 9, 1947, Serial No. 772,998

11 Claims. (Cl. 251—62)

This invention relates to improvements in "through conduit" gate valves, especially those designed to control the flow in conduits carrying fluids, such as oil, under high pressure. A "through conduit" valve is one which in open position leaves the conduit entirely unobstructed to flow at the valve opening. More particularly, the improvement relates to a gate mechanism for such valves, which has a double-taper wedge as shown, for example, in the United States Patent to M. P. Laurent Reissue No. 20,101, dated September 8, 1936. In such a valve, the ported gate mechanism is made in two double tapered sections having abutting inner faces which diverge outwardly from a central portion. Because of this construction when the sections are shifted relative to each other from a centered position, along the line of travel of the gate mechanism at the end of the opening or the closing movement of the valve, a wedge-like action occurs to expand the gate mechanism and to press its outer sealing faces against the valve seats. The advantages of this type of valve are well known and will not be enumerated here.

To move the gate mechanism between full open to full closed positions, it is desirable to provide means to center the two sections so that the mechanism may be collapsed and the valve operated easily and freely, i. e. with minimum friction between the gate sections and their respective seats. This invention provides an improved form of such means.

Accordingly, it is an object of this invention, to provide a gate mechanism of the class described with centering means which has a positive action.

It is another object of this invention to provide a valve gate mechanism with centering means which is enclosed completely therein, to eliminate external projections and provide a compact unit which readily may be assembled therewith.

A further object of this invention is to provide a gate mechanism with centering means which will exert uniform balanced forces on the two sections of the gate mechanism to center the mechanism without binding.

Other objects and advantages of the improved construction will become apparent from the following description and accompanying drawings, in which:

Figure 1 is a sectional view of a gate valve embodying this invention showing the valve in open position.

Figure 2 is a sectional view taken on line 2—2 of Figure 1.

Figure 3 is a sectional view taken on line 3—3 of Figure 1.

Figure 4 is a fragmentary sectional view corresponding to Figure 1, but showing the valve in closed position.

Figure 5 is a fragmentary sectional view corresponding to Figure 1, but showing the valve intermediate between open and closed positions.

Referring now to the drawings, there is shown a gate valve, of the non-rising stem type, having a housing 10 provided with an interior chamber 11 in which are housed the operating parts of the valve. Aligned conduit ports 12 and 13 are formed in opposite walls of the housing 10, are provided with parallel valve seats 14 and 15, the lower ends of which are provided with side flanges that may be formed integrally with the seats and which, together with the seats, serve to guide and confine the gate mechanism to substantially rectilinear movement. The upper portion of the housing 10 is of known construction having a bonnet 16 through which extends a non-rising valve operating stem 17.

The ported valve gate mechanism, which slides in the guides, is formed of two double-tapered, relatively movable sections, one herein termed the gate 18 and the other the segment 19. Both sections have ports 20 and 21 which in the open position of the valve are aligned with the conduit ports 12 and 13 in the housing to permit unobstructed passage of fluid through the valve. The upper end of the gate 18 threadedly receives the valve stem 17, whereby rotation of the stem by means of the usual handwheel 22 raises and lowers the gate which carries the segment therewith as a unit. It readily will be understood that the gate mechanism may be raised and lowered as well by a rising type of valve stem, wherein the stem is threaded to the housing and swivelly connected to the gate. The gate 18 and segment 19, when assembled, are substantially rectangular in horizontal section (as shown in Figure 3), so that their flat outer surfaces sealingly engage the corresponding valve seats. It will be apparent, however, that the sealing faces and corresponding valve seats may be arcuate or other suitable shape in horizontal section.

The inner abutting faces of the gate 18 and segment 19 are formed in two angularly related portions, which diverge outwardly from a central portion 23. Accordingly, on relative movement between the gate and the segment from a centered or collapsed position, in either direction of the line of travel of the mechanism, there results a wedging action effective to expand the gate mechanism and force the outer sealing faces thereof into tight engagement with the valve seats. Relative movement is imparted to the two sections at both ends of travel of the gate mechanism by lugs or projections 24 and 25 on the segment 19 which stop the movement thereof (as shown in Figures 1 and 4) before the gate 18, impelled by the valve stem, reaches the final limit of its travel. Hence, the gate mechanism is expanded into tight sealing engagement with the valve seats in both open and closed positions of the valve.

In order to permit the gate mechanism to be moved freely and easily between open and closed positions, the gate mechanism is provided with means to center the gate 18 and segment 19 when the mechanism is relieved of the expanding force. The centering means is housed in a chamber 26 defined by the walls of opposed recesses, having substantially parallel opposite walls 27 and 28, formed in the abutting faces of the gate and segment. Projecting into the chamber 26 from the gate wall 27 and extending nearly to the opposite segment wall 28 are lugs arranged in two lateral rows spaced longitudinally of the gate 18, i. e. along the line of travel thereof. The lugs 29 in the upper row have abutment faces 30 which are substantially normal to the line of travel of the gate and parallel with and opposed to the abutment faces 31 of the corresponding lugs 32 in the lower row. Each row preferably has four lugs arranged in pairs symmetrically located with respect to the longitudinal centerline of the gate, thus forming, in effect, two sets of opposed pairs of lugs with the individual lugs of each pair separated or spaced apart laterally of the gate, for a purpose later described. Two lateral rows of upper and lower lugs 33 and 34 (Figure 2), having parallel opposed abutment faces 35 and 36 which are also substantially normal to the line of travel of the segment, project from the segment wall 28 into the chamber 26 and extend nearly to the opposite gate wall 27. The rows of segment lugs 33 and 34 are longitudinally spaced the same distance apart as the rows of gate lugs 29 and 32. There are two lugs in each segment row which are so laterally spaced that when the gate and segment are assembled together, the segment lugs 33 and 34 fit into the lateral space between the lugs of each pair of corresponding gate lugs 29 and 32, and, thus, overlap the gate lugs transversely of the gate mechanism. Thus, there are formed, in effect, two composite sets (one on each side of the centerline) of lugs, each set having two opposed groups (of three lugs each, i. e. two gate lugs and one segment lug) of lugs. A coil spring 37 is inserted between the opposed groups of lugs of each composite set to bear in common against the abutment faces 30 and 35 of the lugs in each upper group and the abutment faces 31 and 36 of the lugs in each lower group.

In the collapsed, or centered, position of the gate and segment, as shown in Figure 5, the spring engaging abutment faces of each group of lugs are aligned transversely of the direction of movement of the gate mechanism so that the springs 37 bear equally against the lugs of each group, thus exerting no force to cause relative longitudinal movement, or shifting, between the gate and segment. In this position, however, the springs 37 are compressed or loaded to an extent which assists in maintaining the assembly of the gate and segment. When relative movement, in either direction, between the gate and segment occurs, however, the springs 37 exert a force on the lugs to return the parts back into centered position.

For example, when the valve is in fully open position, as shown in Figures 1 and 2, the gate is moved from its centered position a small distance upwardly with respect to the segment, with a corresponding displacement between the respective lugs in each group. In this displaced position of the lugs, the springs 37 bear against only the segment lugs 33 in the upper groups and against only the gate lugs 32 in the lower groups, thus exerting a force to urge the gate and segment back into centered position immediately the expanding force is relieved. Opposite relative movement between the gate and segment (when the valve is in closed position as shown in Figure 4) has a similar effect, i. e. the springs 37 bear against only the segment lugs 34 in the lower groups and against only the gate lugs 29 in the upper groups.

The springs 37 are so proportioned that when they are inserted in place in the assembly they are somewhat compressed or loaded, to exert an initial force, so that even a very small relative movement between the gate and the segment in either direction of relative displacement is resisted promptly, and this force increases with increase in relative displacement of the gate and segment. The arrangement of the lugs, i. e. pairs of gate lugs with intermediate single segment lugs, provides centered bearing surfaces for the springs to prevent their slipping or sliding off the abutment faces. Two springs, one on each side of the centerline, instead of a single spring provide balanced forces on the gate and segment to prevent any transverse twisting or binding movement between the gate and the segment. The two-spring arrangement also provides space at the center of the chamber 26 for the valve stem 17, when the valve, as shown, is a non-rising type.

It will be seen that there has been provided a compact unitary gate mechanism with no obstructing external projections. The mechanism may be assembled easily by compressing the springs somewhat and inserting them in place between the opposed gate lugs. The segment may then be assembled with the gate, and since the opposed segment lugs have the same longitudinal spacing as the gate lugs, the segment lugs readily will fit over the springs. Modifications of the specific embodiment of the invention which has been described readily will be apparent to those skilled in the art. Accordingly, the invention encompasses all modifications which come within the spirit and scope of the following claims.

I claim:

1. In a gate valve having a housing forming a valve chamber provided with aligned conduit ports, opposed parallel valve seats, and an expansible valve gate assemblage mounted for rectilinear movement between the seats to open and close the valve, said assemblage comprising: two ported abutting members having parallel outer faces to engage the valve seats and abutting inner faces which diverge outwardly from the central waist portions of said members to provide two sets of wedging surfaces effective to expand said assemblage and force said members oppositely into sealing engagement with the valve seats upon relative shifting between said members in either direction of their movement from a centered relative position corresponding to the minimum overall transverse dimension of said assemblage between said outer faces; means defining at least one pair of opposed abutment faces on each of said members disposed substantially normal to the direction of movement thereof, the spacing between the faces of each of said pairs being substantially equal; and compressible resilient means interposed in common between the opposed faces of each of said pairs, whereby upon said relative shifting said resilient means is compressed between an abutment face on one of said members and an opposed abutment face on the other of said members to thereby yieldingly resist said shifting.

2. The structure defined in claim 1, the said abutment faces being disposed interiorly of said members.

3. In a gate valve having a housing forming a valve chamber provided with aligned conduit ports, opposed parallel valve seats, and an expansible valve gate assemblage mounted for rectilinear movement between the seats to open and close the valve, said assemblage comprising: two ported abutting members having parallel outer faces to engage the valve seats and abutting inner faces which diverge outwardly from the central waist portions of said members to provide two sets of wedging surfaces effective to expand said assemblage and force said members oppositely into sealing engagement with the valve seats upon relative shifting between said members in either direction of their movement from a centered relative position corresponding to the minimum overall transverse dimension of said assemblage between said outer faces, said members having a recess formed therebetween; means defining at least one pair of opposed abutment faces on one of said members; means defining at least one pair of opposed abutment faces on the other of said members, all of said faces being located in said recess and disposed substantially normal to the direction of movement of said members, corresponding faces of said pairs being aligned when said members are in said centered position; and at least one compressible spring interposed in common between the opposed faces of each of said pairs, whereby said spring yieldingly resists said shifting.

4. A valve gate assemblage adapted for rectilinear movement between opposed parallel valve seats comprising: two abutting members having parallel outer faces to engage the valve seats and abutting inner faces which diverge outwardly from the central waist portions of said members to provide two sets of wedging surfaces effective to expand said assemblage and force said members oppositely into sealing engagement with the valve seats upon relative shifting between said members in either direction of their movement from a centered relative position corresponding to the minimum overall transverse dimension of said assemblage between the valve seats; means defining at least one pair of opposed abutment faces on each of said members disposed substantially normal to the direction of movement thereof, said abutment faces on one of said members being aligned with corresponding abutment faces on the other of said members when said members are in said centered position; and compressible resilient means interposed in common between the faces of each of said pairs, whereby said resilient means is operative to yieldingly resist said relative shifting and to return said members to their centered position when the shifting force is relieved.

5. A valve gate assemblage adapted for rectilinear movement between opposed parallel valve seats comprising: two abutting members having parallel outer faces to engage the valve seats and abutting inner faces which diverge outwardly from the central waist portions of said members to provide two sets of wedging surfaces effective to expand said assemblage and force said members oppositely into sealing engagement with the valve seats upon relative shifting between said members in either direction of their movement from a centered relative position corresponding to the minimum overall transverse dimension of said assemblage between the valve seats; means defining at least two laterally spaced pairs of opposed abutment faces on one of said members; means defining at least one pair of opposed abutment faces on the other of said members, all said faces being disposed substantially normal to the direction of movement of said members with the faces of said one pair interfitting in the lateral space between corresponding faces of said two pairs, corresponding faces of all said pairs being aligned when said members are in said centered position; and a compressible coil spring interposed in common between and bearing against the opposed faces of each of said pairs, whereby relative shifting of said members in either direction causes one end of said spring to bear against abutment faces on only one of said members and the other end of said spring to bear against abutment faces on only the other of said members to thereby oppose said shifting.

6. In a gate valve having a housing forming a valve chamber provided with aligned conduit ports, opposed parallel valve seats, and an expansible valve gate assemblage mounted for rectilinear movement between the seats to open and close the valve, said assemblage comprising: two ported abutting members having parallel outer faces to engage the valve seats and abutting inner faces which diverge outwardly from the central waist portions of said members to provide two sets of wedging surfaces effective to expand said assemblage and force said members oppositely into sealing engagement with the valve seats upon relative shifting between said members in either direction of their movement from a centered relative position corresponding to the minimum overall transverse dimension of said assemblage between said outer faces; and means, including at least one coil spring, the axis of which is disposed substantially parallel to the direction of movement of said members, for yieldingly resisting shifting of said members from their centered position and to return said members to their centered position when the shifting force is relieved.

7. The structure defined in claim 6 in which the spring is disposed interiorly of the members.

8. The structure set forth in claim 3, both of said means defining an even number of pairs of opposed abutment faces, said pairs being arranged symmetrically with respect to the longitudinal axis of the members, and including an even number of compressible springs associated with said abutment faces, whereby the forces resisting the shifting are balanced with respect to the longitudinal axis of the assemblage.

9. The structure set forth in claim 1, the said compressible resilient means being under some initial compression when said members are in their centered position and said shifting of the said members from centered position in either direction of their movement being effective to increase said compression.

10. The structure set forth in claim 1, the said compressible resilient means comprising at least one coiled spring.

11. The structure set forth in claim 1, the said compressible resilient means comprising a pair of coiled springs, spaced laterally of the gate assemblage, one on either side of the longitudinal axis thereof.

JAMES M. FOWLER.

REFERENCES CITED

The following references are of record in the file of this patent:

UNITED STATES PATENTS

| Number | Name | Date |
| --- | --- | --- |
| 2,002,780 | Laurent | May 28, 1935 |
| 2,394,128 | Wennerby | Feb. 5, 1946 |